United States Patent [19]
Janssens et al.

[11] Patent Number: 5,510,225
[45] Date of Patent: *Apr. 23, 1996

[54] THERMAL DYE SUBLIMATION TRANSFER DONOR ELEMENT

[75] Inventors: Wilhelmus Janssens, Aarschot; Luc Vanmaele, Lochristi, both of Belgium

[73] Assignee: AGFA-GEVAERT, N.V., Mortsel, Belgium

[*] Notice: The term of this patent shall not extend beyond the expiration date of Pat. No. 5,366,951.

[21] Appl. No.: 74,664

[22] Filed: Jun. 10, 1993

[30] Foreign Application Priority Data

Jul. 14, 1992 [EP] European Pat. Off. ............ 92202157.1

[51] Int. Cl.$^6$ ..................................................... B41M 5/38
[52] U.S. Cl. .......................... 430/200; 430/201; 430/945; 503/227; 8/471; 534/850; 534/856
[58] Field of Search ..................................... 430/200, 201, 430/945; 503/227; 428/914, 913; 8/471; 534/850, 856

[56] References Cited

U.S. PATENT DOCUMENTS

| 4,816,435 | 3/1989 | Murata et al. | 503/227 |
| 5,151,405 | 9/1992 | Janssens et al. | 503/227 |
| 5,366,951 | 11/1994 | Vanmaele | 503/227 |

FOREIGN PATENT DOCUMENTS

| 0432314 | 6/1991 | European Pat. Off. | 430/201 |
| 0453020 | 10/1991 | European Pat. Off. | 430/201 |
| 0966779 | 10/1950 | France | 534/856 |
| 0088013 | 5/1895 | Germany | 534/856 |

*Primary Examiner*—Charles L. Bowers, Jr.
*Assistant Examiner*—Martin J. Angebranndt
*Attorney, Agent, or Firm*—Breiner & Breiner

[57] ABSTRACT

Dye-donor element for use according to thermal dye sublimation transfer comprising a support having thereon a dye layer containing a bis(N,N-dialkyl(ene) or N,N-diaryl or N-alkyl(ene),N-aryl)aniline azo dye.

16 Claims, No Drawings

1

THERMAL DYE SUBLIMATION TRANSFER DONOR ELEMENT

1. FIELD OF THE INVENTION

The present invention relates to dye-donor elements for use according to thermal dye sublimation transfer.

2. BACKGROUND OF THE INVENTION

Thermal dye sublimation transfer also called thermal dye diffusion transfer is a recording method in which a dye-donor element provided with a dye layer containing sublimating dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, one side of which is covered with a dye layer, which contains the printing dyes. Usually an adhesive or subbing layer is provided between the support and the dye layer. Normally the opposite side is covered with a slipping layer that provides a lubricated surface against which the thermal printing head can pass without suffering abrasion. An adhesive layer may be provided between the support and the slipping layer.

The dye layer can be a monochrome dye layer or it may comprise sequential repeating areas of different colored dyes like e.g. of cyan, magenta, yellow and optionally black hue. When a dye-donor element containing three or more primary color dyes is used, a multicolor image can be obtained by sequentially performing the dye transfer process steps for each color.

Many of the dyes proposed for use in thermal dye sublimation transfer are not sufficient in performance because they yield inadequate transfer densities at reasonable coating coverages. Especially for transfer on transparant film materials as receiving element, the transfer densities obtained are too low.

The yellow mono-arylazoaniline dyes described in EP 432314 yield relatively high densities on transparant receiver elements. A disadvantage of these mono-arylazoaniline dyes is their high degree of retransfer, i.e. the retransfer in course of time of part of the dye transferred to the receiving sheet from the transferred dye image to a sheet of paper or any other substrate in contact with the dye-receiving layer.

Therefore it is an object of the present invention to provide yellow dyes for use in thermal dye sublimation transfer materials which have high extinction coefficients and yield high transfer densities especially on transparant receiver elements and which show a decreased degree of retransfer.

A primary colored dye layer, for example, a magenta or cyan or yellow dye layer, may comprise only one primary colored dye (a magenta, cyan or yellow dye respectively) or may comprise a mixture of two or more primary colored dyes of the same hue (two magenta, two cyan or two yellow dyes respectively).

For obtaining black recording by thermal dye sublimation transfer, transfer is performed using a dye-donor element having a black colored layer usually containing a mixture of yellow, magenta and cyan colored image dyes. Mixtures of yellow, magenta and cyan dyes for the formation of a black colored layer are described in e.g. EP 453020, U.S. Pat. No. 4,816,435 and JP 01/136787.

Dye images transferred from dye-donor elements containing mixtures of dyes frequently show an increased fading rate due to a photochemical effect, known as catalytic fading of dye mixtures.

This phenomenon was investigated in textile dyeing by Rembold and Kramer (see Journal of the Society of Dyers and Colourists, vol. 94 (1978), pages 12–17) and by Asquith and Ingham (see Journal of the Society of Dyers and Colourists, vol. 89 (1973), pages 81–85). Catalytic fading is related to the observation that the light fastness of certain dyes applied to textiles alone is much better than when applied as mixtures. In most reported cases, the light fastness of cyan, violet or red dyes deteriorates when a yellow dye is added.

It is known that indoaniline dyes have a favourable effect on this phenomenon in that mixtures of dyes containing indoaniline dyes show less catalytic fading effects (see, e.g., the description in U.S. Pat. No. 4,933,226; U.S. Pat. No. 5,024,990; U.S. Pat. No. 5,026,679; EP 0 279 330; U.S. Pat. No. 4,816,435). Unfortunately these indoaniline dyes have poor light stability.. According to EP 423796 fading of a thermally transferred image can be obtained by including an anti-fading group in a dye. Amongst the numerous examples given is listed a bisanilino-azodye that has subsituted alkyls or its aniline nitrogens. It has however been found that transfer of this type of dyes is insatisfactory.

Therefore it is another object of the present invention to provide dye-donor elements, in particular black colored dye-donor elements, containing indoaniline dyes yielding transferred dye images showing no catalytic fading effects and improved light stability.

3. SUMMARY OF THE INVENTION

These and other objects are achieved by using a dye-donor element comprising a support provided with a dye layer containing at least one azo dye corresponding to the following general formula (I):

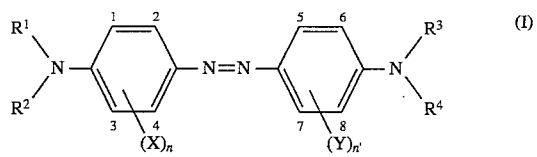

wherein
each of $R^1$ to $R^4$ (independently) represent hydrogen, an unsubstituted alkyl group, a cycloalkyl group or an aryl group, which groups may be substituted, or $R^1$ and $R^2$ and/or $R^3$ and $R^4$ may be joined together to form a 5- or 6-membered heterocyclic ring system which may be substituted, or each of $R^1$ to $R^4$ independently can be joined to the carbon atom of the aromatic ring at a position ortho to the position of attachment of the anilino nitrogen to form a 5- or 6-membered ring, which ring may be substituted;

X and Y (independently) represent any substituent, e.g. SH, OH, halogen, $NO_2$, CN, alkyl, amino, carbonamido, sulfonamido, acylamino, sulfonylamino, phosphorylamino, alkoxy, thioalkoxy, alkoxycarbonyl, aryloxycarbonyl;

n and n' (independently) represent 0,1,2,3 or 4, the X and Y substituents respectively may be the same or different when n or n' respectively is greater than 1.

Yellow dye-donor elements containing the present yellow bis(N,N-dialkyl(ene) or N,N-diaryl or N-alkyl(ene),N-aryl aniline) azo dyes give transferred dye images having high densities especially on transparant receiver sheets and showing less retransfer.

Further dye-donor elements containing the present bis(N,N-dialkyl(ene) or N,N-diaryl or N-alkyl(ene),N-aryl aniline) azo dyes in admixture with indoaniline dyes, for example for the formation of black colored dye-donor elements, give transferred dye images showing no catalytic fading and improved light stability.

4. DETAILED DESCRIPTION OF THE INVENTION

Preferably $R^1$ to $R^4$ (independently) represent an unsubstituted alkyl group (e.g. ethyl, butyl), X represents hydroxy, amino, acylamino, alkoxy, sulfonylamino, phosphorylamino, carbonamido or sulfonamido, generally in the 4-position, n represents 0 or 1 and n' represents 0.

Dyes corresponding to formula (I) generally have a yellow to orange hue.

Examples of suitable azo dyes according to the general formula (I) are listed in table 1 below together with their wavelength of maximum absorption ($\lambda_{max}$) and extinction coefficient ($\epsilon$), both measured in methanol.

7 grams (0.0424 mole) of compound (a) and 11.2 grams (0.0424 mole) of compound (b) were dissolved in acetic acid and stirred at room temperature for three hours. The solution was poured into a solution of 60 grams of sodium acetate trihydrate in 250 ml of methanol. The mixture was stirred for 90 minutes. The crystals were filtered, washed with methanol and crystallized from 1-methoxy-2-propanol. 8.8 grams of dye D2 were obtained (63%; melting point 195° C).

Bis(N,N-dialkyl(ene) or N,N-diaryl or N-alkyl(ene),N-aryl)aniline azo dyes according to formula (I) are also useful in inkjet printing, as is also the case for the dyes described in EP 394563, EP 400706, EP 384990, EP 384040, EP 453020, EP 432829, EP 393252, EP 432313, EP 444327 and EP 485665.

In a particular embodiment of the present invention the dyes according to the formula (I) are used together with cyan indoaniline dyes (in the same dye area or in another dye area) corresponding to the following general formula (II):

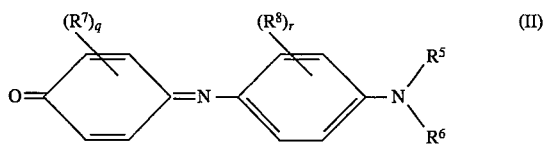

wherein:

$R^5$ and $R^6$ (independently) represent hydrogen, an alkyl group, a cycloalkyl group, an aryl group, an allyl group or an alkenyl group, which groups may be substituted, or $R^5$ and $R^6$ together with the nitrogen to which they are attached form the necessary atoms to close a 5- or 6-membered heterocyclic ring, which ring may be

TABLE 1

| Dye | $R^1$ | $R^2$ | $R^3$ | $R^4$ | X | Y | $\epsilon$ (1 mol$^{-1}$cm$^{-1}$) | $\lambda_{max}$ (nm) |
|---|---|---|---|---|---|---|---|---|
| D1 | $C_2H_5$ | $C_2H_5$ | $C_2H_5$ | $C_2H_5$ | — | — | $4.19.10^4$ | 475 |
| D2 | $C_2H_5$ | $C_2H_5$ | $C_2H_5$ | $C_2H_5$ | 4-OH | — | $4.12.10^4$ | 495 |
| D3 | $C_4H_9$ | $C_4H_9$ | $C_2H_5$ | $C_2H_5$ | 4-NHCOCH$_3$ | — | $4.24\ 10^4$ | 497 |
| D4 | $C_4H_9$ | $C_4H_9$ | $C_2H_5$ | $C_2H_5$ | 4-NHSO$_2$CH$_3$ | — | $4.48.10^4$ | 495 |
| D5 | $CH_3$ | $CH_3$ | $CH_3$ | $CH_3$ | 4-OH | — | $3.72\ 10^4$ | 480 |
| D6 | $C_2H_5$ | $C_2H_5$ | $C_2H_5$ | $C_2H_5$ | 4-NHCOCH | — | $4.40.10^4$ | 496 |
| D7 | $C_2H_5$ | $C_2H_5$ | $C_2H_5$ | $C_2H_5$ | 4-NHCOCH$_3$ | 8-Cl | $4.20.10^4$ | 470 |
| D8 | $C_2H_5$ | $C_2H_5$ | $CH_3$ | $CH_3$ | 4-NHCOCH$_3$ | — | | |
| D9 | $C_2H_5$ | $C_2H_5$ | $C_2H_5$ | $C_2H_5$ | 4-CH$_3$ | — | | |
| D10 | $C_4H_9$ | $C_4H_9$ | $C_2H_5$ | $C_2H_5$ | 4-NH$_2$ | — | | |

The dyes mentioned in table 1 can be prepared through coupling of the required aniline with a suitable diazonium salt. By way of example the preparation of dye D2 is described below.

Preparation of dye D2

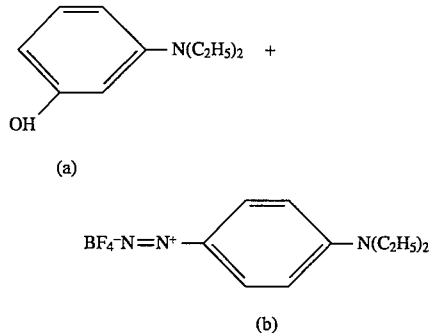

substituted, or $R^5$ and/or $R^6$ together with the nitrogen to which they are attached and either or both carbon atoms of the phenyl ring ortho to said nitrogen atom form a 5- or 6-membered heterocyclic ring, which ring may be substituted;

$R^7$ represents halogen, hydroxy, cyano, an alkyl group, a cycloalkyl group, an aryl group, an alkoxy group, an aryloxy group, an alkylthio group, an arylthio group, an amino group, an alkylcarbonylamino group, an arylcarbonylamino group, an arylsulfonylamino group, an alkoxycarbonylamino group, an aryloxycarbonylamino group, an alkylthiocarbonylamino group, an arylthiocarbonylamino group, an alkylphosphoramidate group, an arylphosphoramidate group, an alkylphosphonamidate group, an arylphosphonamidate group, an alkylaminocarbonyl group or an arylaminocarbonyl group, which groups may be substituted, or $R^7$ represents the necessary atoms to close an alicyclic or aromatic or heterocyclic ring (which rings may be substituted) fused-on the phenyl ene ring;

q represents 0,1,2,3 or 4, the $R^7$ substituents may be the same or different when q is greater than 1;

$R^8$ can have any of the significances given to $R^7$ or can represent the necessary atoms to close a alicyclic or aromatic or heterocyclic ring (which rings may be substituted) fused-on the phenyl ring;

r represents 0,1,2,3 or 4, the $R^8$ substitutents may be the same or different when r is greater than 1.

Examples of suitable indoaniline dyes corresponding to the general formula (II) are listed in table 2 below.

TABLE 2

| | |
|---|---|
| 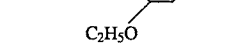 | $C_1$ |
|  | $C_2$ |
| 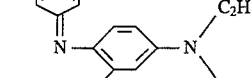 | $C_3$ |
| 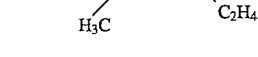 | $C_4$ |
| 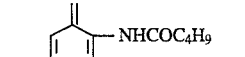 | $C_5$ |
| 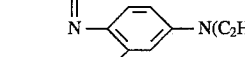 | $C_6$ |
| 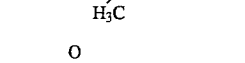 | $C_7$ |
| 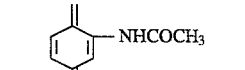 | $C_8$ |

TABLE 2-continued

| | |
|---|---|
| 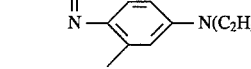 | $C_9$ |
| 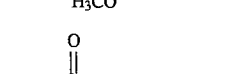 | $C_{10}$ |
| 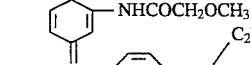 | $C_{11}$ |
| 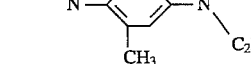 | $C_{12}$ |
|  | $C_{13}$ |
| 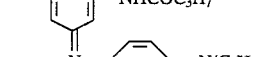 | $C_{14}$ |
| 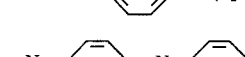 | $C_{15}$ |
| 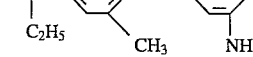 | $C_{16}$ |
|  | $C_{17}$ |
|  | $C_{18}$ |

TABLE 2-continued

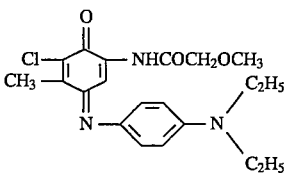 C$_{19}$

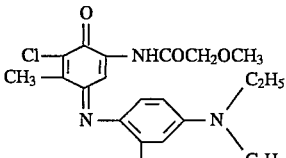 C$_{20}$

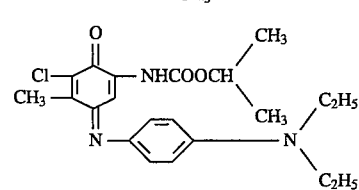 C$_{21}$

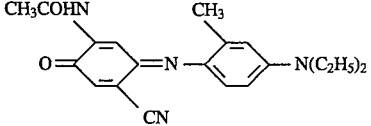 C$_{22}$

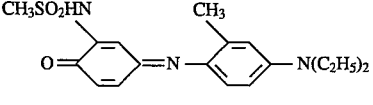 C$_{23}$

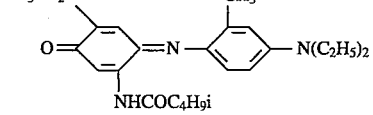 C$_{24}$

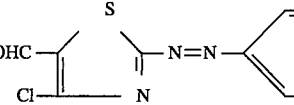 C$_{25}$

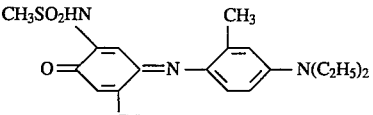 C$_{26}$

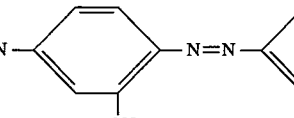 C$_{27}$

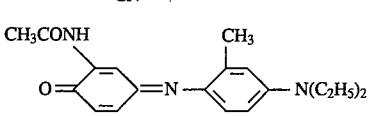 C$_{28}$

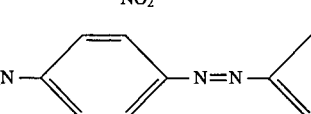 C$_{29}$

In table 3 are listed absorption maxima ($\lambda_{max}$) and extinction coefficients ($\epsilon$) of some of the cyan dyes listed in table 2, measured in methanol.

TABLE 3

| dye | $\lambda_{max}$ (nm) | $\epsilon$ (1 mol$^{-1}$cm$^{-1}$) |
| --- | --- | --- |
| C5  | 654 | 28469 |
| C8  | 670 | 38297 |
| C18 | 655 | 27715 |
| C22 | 707 | 31100 |
| C27 | 674 | 29869 |
| C26 | 651 | 26200 |

In a particular embodiment of the present invention the mixture of dyes according to formula (I) and dyes according to formula (II) are used in a black colored dye-donor element.

In order to obtain a neutral black density it may then be necessary to combine the yellow dyes of general formula (I) and the cyan dyes of general formula (II), depending on their absorption maxima, with magenta dyes.

In a preferred embodiment magenta azo dyes as described in EP 216483 (heterocyclic azo aniline dyes) and EP 235939 (arylazoaniline dyes with electron withdrawing substituents on the aryl nucleus) with absorption maxima between 520 and 600 nm are used. Suitable magenta dyes are Dye 1 to Dye 23 and M1 to M20 described in EP 453020.

Examples of suitable magenta dyes are listed in table 4.

TABLE 4

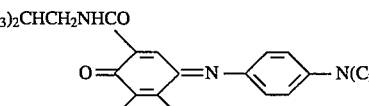 M11

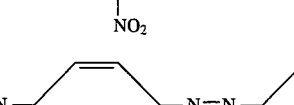 M21

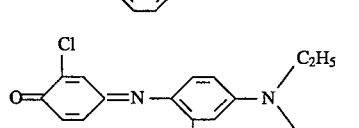 M22

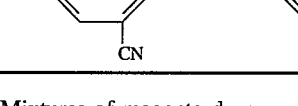 M23

Mixtures of magenta dyes are also useful. For example, the magenta 4-chloro, 5-formylthiazol-2-ylazoaniline dye M11 can be used in admixture with an arylazoaniline type magenta dye M21.

Other yellow dyes for use together with the dyes of formula (I) and formula (II) in the formation of a black colored dye layer include the yellow dyes described in EP 400706, EP 432829, EP 432313, EP 432314, U.S. Pat. No. 4,816,435 and U.S. Pat. No. 4,833,123.

Examples of suitable yellow dyes are listed in table 5 below.

TABLE 5
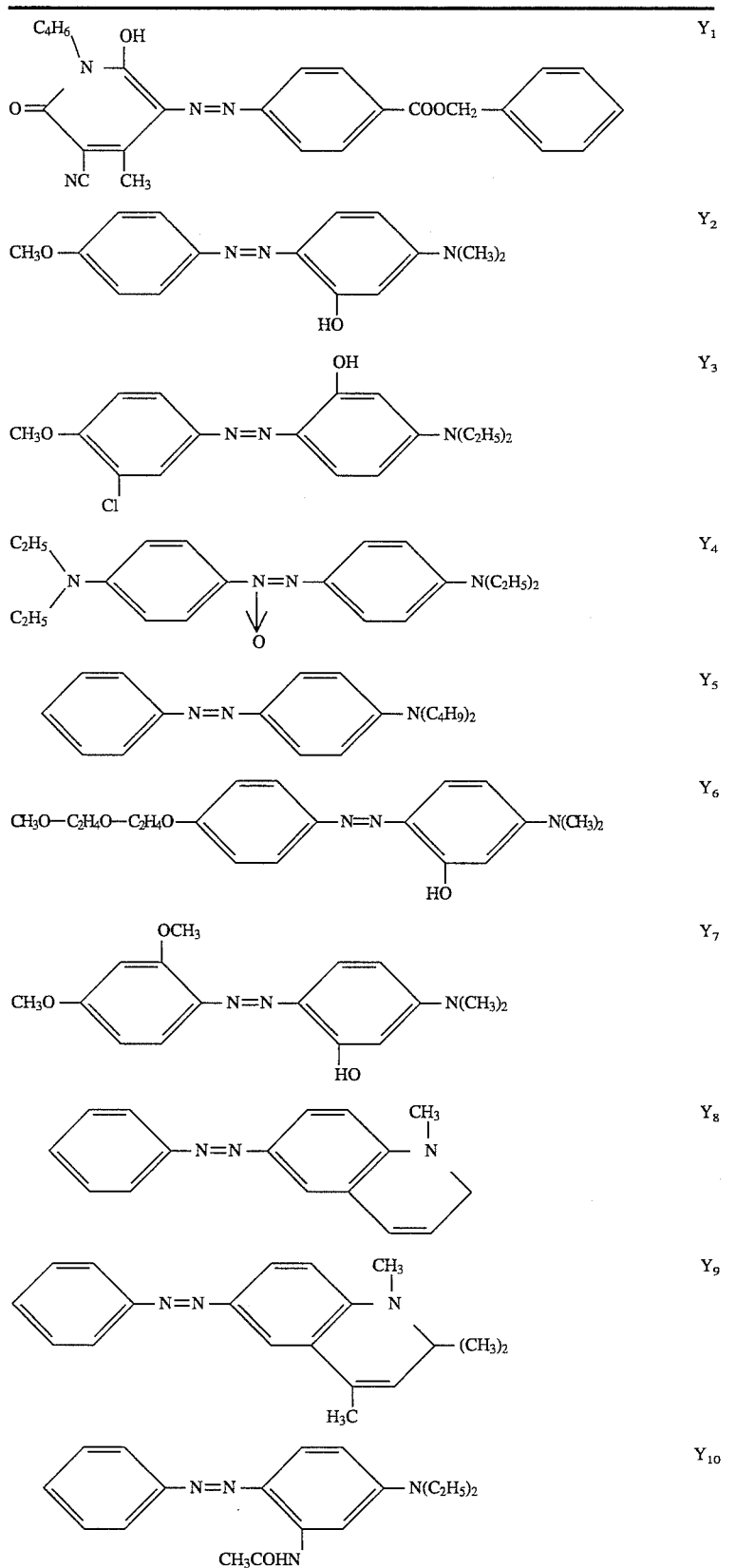

TABLE 5-continued

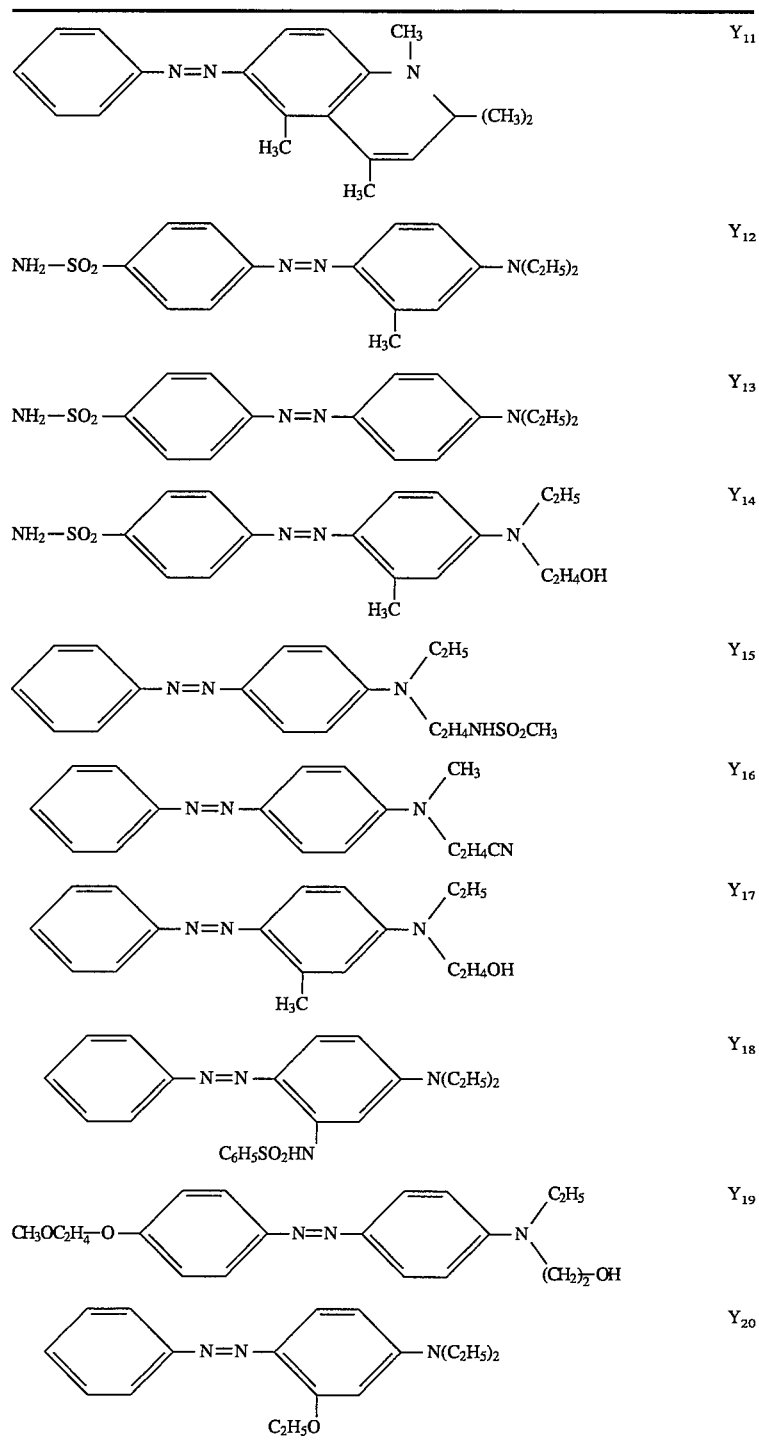

In order to obtain a neutral black density, without metameric effects, it may be necessary to add to the mixture of the yellow dyes of formula (I), the cyan dyes of formula (II) and the magenta dyes as described above, a fourth, short absorbing yellow dye with absorption maxi mum below 460 nm.

In a preferred embodiment, to obtain a high quality black, free from metameric effect and without introducing again catalytic fading by bringing in a yellow dye, yellow dyes of the following general formula (III) are used:

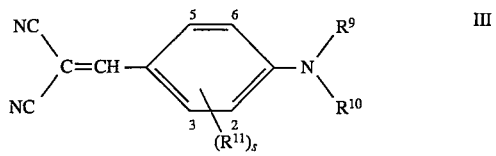

wherein:

$R^9$ and $R^{10}$ (same or different) represent hydrogen, an alkyl group, a cycloalkyl group or an aryl group, which groups may be substituted, or $R^9$ and $R^{10}$ may be joined together to form a 5- or 6-membered heterocyclic ring system, which ring may be substituted, or each of $R^9$ and $R^{10}$ can be joined to the carbon atom of the aromatic ring at a position ortho to the position of attachment of the anilino nitrogen to form a 5- or 6-membered ring, which ring may be substituted;

$R^{11}$ represents a substituent, e.g. alkyl, CN, alkoxy, thioalkoxy, halogen, $NO_2$, acylamino;

s represents 0,1,2,3 or 4, the $R^{11}$ substituents may be the same or different when s is greater than 1.

Examples of yellow dyes according to general formula (III) are listed in table 6 below.

TABLE 6

| $R^9$ | $R^{10}$ | $R^{11}$ | |
|---|---|---|---|
| $C_2H_5$ | –phenyl–phenyl–$OC_2H_4$– | 3 $CH_3$– | Y21 |
| $C_4H_9$ | –phenyl | H | Y22 |
| $C_4H_9$ | $CH_3O$–phenyl– | H | Y23 |
| –phenyl | –phenyl | H | Y24 |
| $C_4H_9$– | $(CH_3)_2CH$–O–phenyl– | H | Y25 |
| $C_2H_5$ | $C_2H_5$– | H | Y26 |
| $C_4H_9$– | $(CH_3)_2CH$–O–phenyl– | 3 $CH_3O$– | Y27 |

In compounding the dyes for forming a black colored dye layer it is necessary to compound at least one yellow dye of formula I, at least one magenta dye and at least one cyan dye. In other words, a single magenta, cyan and yellow dye may be used in the formation of the black colored layer or a mixture of one or more magenta dyes with one or more cyan dyes and with one or more yellow dyes may be used.

The compounding ratio of the yellow dyes according to general formula (I), the cyan dyes according to general formula (II), the magenta dyes and optionally other yellow dyes according to general formula (III) in the black mixture is properly from 10 to 50% by weight for the yellow dyes of formula (I), from 20 to 60% by weight for the cyan dyes of formula (II), from 10 to 60% by weight for the magenta dyes and from 0 to 40% for the yellow dyes of formula (III).

In a preferred embodiment of this invention the black colored dye layer is composed of the following combination of dyes: M11, C26, Y23, D3 or M21, C21, Y25 and D2.

The dye layer of the dye-donor element of the present invention is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed has a thickness of about 0.2 to 5.0 μm, preferably 0.4 to 2.0 μm, and the amount ratio of dye to binder is between 9:1 and 1:3 by weight, preferably between 3:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, nitrocellulose, cellulose acetate formate, cellulose acetate hydrogen phthalate, celluloseacetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic. Preferably cellulose acetate butyrate or copolystyrene-acrylonitrile is used as binder for the dye layer of the present invention.

The black colored dye donor element of the present invention can be used for the recording of a black and white image. It can also be used for the recording of a colored image together with primary color dye-donor elements comprising respectively a magenta dye or a mixture of magenta dyes, a cyan dye or a mixture of cyan dyes and a yellow dye or a mixture of yellow dyes.

Any dye can used in such a primary color dye layer provided it is easily transferable to the dye-image-receiving layer of the receiver sheet by the action of heat.

Typical and specific examples of primary color dyes for use in thermal dye sublimation transfer have been described in, e.g., EP 400706, EP 209990, EP 216483, EP 218397, EP 227095, EP 227096, EP 229374, EP 235939, EP 247737, EP 257577, EP 257580, EP 258856, EP 279330, EP 279467, EP 285665, U.S. Pat. No. 4,743,582, U.S. Pat. No. 4,753,922, U.S. Pat. No. 4,753,923, U.S. Pat. No. 6,475,7046, U.S. Pat. No. 4,769,360, U.S. Pat. No. 4,771,035, JP 84/78894, JP 84/78895, JP 84/78896, JP 84/227490, JP 84/227948, JP 85/27594, JP 85/30391, JP 85/229787, JP 85/229789, JP 85/229790, JP 85/229791, JP 85/229792, JP 85/229793, JP 85/229795, JP 86/41596, JP 86/268493, JP 86/268494, JP 86/268495 and JP 86/284489.

The coating layer may also contain other additives, such as curing agents, preservatives, organic or inorganic fine particles, dispersing agents, antistatic agents, defoaming agents, viscosity controlling agents, etc., these and other ingredients being described more fully in EP 133011, EP 133012, EP 111004 and EP 279467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 μm. The support may also be coated with an adhesive or subbing layer, if desired.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred to as dye-barrier/subbing layers.

Preferably the reverse side of the dye-donor element is coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. No. 4567113, U.S. Pat. No. 4,572,860, U.S. Pat. No. 4,717,711. Preferably the slipping layer comprises as binder a styrene-acrylonitrile copolymer or a styrene-acrylonitrile-butadiene copolymer or a mixture hereof or a polycarbonate as described in European patent application no. 91202071.6 and as lubricant in an amount of 0.1 to 10% by weight of the binder (mixture) a polysiloxane-polyether copolymer or polytetrafluoroethylene or a mixture hereof.

The support for the receiver sheet that is used with the dye-donor element may be a transparant film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester. Blue-colored polyethylene terephthalate film can also be used as support.

To avoid poor adsorption of the transferred dye to the support of the receiver sheet this support must be coated with a special surface, a dye-image-receiving layer, into which the dye can diffuse more readily. The dye-imaging-receiving layer may comprise, for example, a polycarbonate, a polyurethane, a polyester, a polyamide, polyvinyl chloride, polystyrene-co-acrylontrile, polycaprolactone or mixtures thereof. The dye-image receiving layer may also comprise a heat-cured product of poly(vinylchloride-co-vinylacetate-co-vinylalcohol) and polyisocyanate. Suitable dye-receiving layers have been described in e.g. EP 133011, EP 133012, EP 144247, EP 227094, EP 228066.

In order to improve the light resistance and other stabilities of recorded images, UV absorbers, singlet oxygen quenchers such as HALS-compounds (Hindered Amine Light Stabilizers) and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating from the back of the donor element. The transfer of the dye is accomplished by heating for about several milliseconds at a temperature of 400° C.

When the process is performed for but one single color, a monochrome dye transfer image is obtained. A multicolor image can be obtained by using a donor element containing three or more primary color dyes and sequentially performing the process steps described above for each color. The above sandwich of donor element and receiver sheet is formed on three occasions during the time when heat is applied by the thermal printing head. After the first dye has been transferred, the elements are peeled apart. A second dye-donor element (or another area of the donor element with a different dye area) is then brought in register with the dye-receiving element and the process repeated. The third color and optionally further colors are obtained in the same manner.

In addition to thermal heads, laser light, infrared flash or heated pens can be used as the heat source for supplying heat energy. Thermal printing heads that can be used to transfer dye from the dye-donor elements of the present invention to a receiver sheet are commercially available. In case laser light is used, the dye layer or another layer of the dye element has to contain a compound that absorbs the light emitted by the laser and converts it into heat, e.g. carbon black.

Alternatively, the support of the dye-donor element may be an electrically resistive ribbon consisting of, for example, a multi-layer structure of a carbon loaded polycarbonate coated with a thin aluminum film. Current is injected into the resistive ribbon by electrically addressing a print head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology compared to the thermal head technology where the various elements of the thermal head get hot and must cool down before the head can move to the next printing position.

The black dye-donor elements according to the present invention are preferably used in a monochrome black thermal sublimation transfer process for obtaining a hard copy of a medical diagnostic image preferably on a transparant or blue-colored support.

The following examples are provided to illustrate the invention in more detail without limiting, however, the scope thereof.

EXAMPLE 1

Black colored dye-donor elements for use according to thermal dye sublimation transfer were prepared as follows.

A coating solution was prepared consisting of 10 ml 2-butanone as solvent, 50 mg co-acrylonitrile-styrene as binder together with the quantities of dyes as indicated in the tables 7 and 8. From this solution a layer having a wet thickness of 100 μm was coated on 6 μm thick polyethylene terephthalate film. The resulting layer was dried by evaporation of the solvent.

A commercially available Mitsubishi material type CK 100 TS (transparant receiver) was used as receiving element.

The dye-donor element was printed in combination with the receiving element in a Mitsubishi CP 100 E printer.

The receiver sheet was separated from the dye-donor element and the color density of the recorded black image was measured by means of a Macbeth TR 924 densitometer in the red, green and blue region in Status A mode, and with the visual filter.

This experiment was repeated for each of the dye mixtures identified in table 7 and 8. As a result thereof black colored records of visual densities shown in table 7 and 8 were obtained.

Thereafter, the receiver sheet was subjected to irradiation by a Xenon lamp of 150 klux for the hours indicated in the tables 7 and 8, the densities were measured again and the density loss or gain (in %) was calculated and given in the tables 7 and 8.

In table 7 are given the results obtained with comparative black donor elements of the prior art.

In table 8 are given the results obtained with black donor elements according to the invention.

By comparison of the results from table 7 and table 8 it is clear that the light stability of the black mixtures according to the invention is markedly improved, besides an increase in visual density.

TABLE 7

| Mixture of dyes nos. | mg | Red 4 h | Red 12 h | Red 28 h | Green 4 h | Green 12 h | Green 28 h | Blue 4 h | Blue 12 h | Blue 28 h | Visual 4 h | Visual 12 h | Visual 28 h | Density Visual |
|---|---|---|---|---|---|---|---|---|---|---|---|---|---|---|
| C26 | 30 | −6 | −16 | −30 | 0 | −3 | −12 | −32 | −60 | −65 | 0 | −1 | −11 | |
| M11 | 50 | | | | | | | | | | | | | |
| Y4 | 30 | | | | | | | | | | | | | 220 |
| C26 | 30 | −2 | −10 | −24 | 0 | −2 | −10 | 0 | −2 | −15 | 0 | −5 | −14 | |
| M11 | 50 | | | | | | | | | | | | | |
| Y3 | 30 | | | | | | | | | | | | | 224 |
| C26 | 30 | −7 | −17 | −35 | −5 | −9 | −22 | −1 | 0 | −4 | −5 | −11 | −27 | |
| M22 | 50 | | | | | | | | | | | | | |
| Y3 | 30 | | | | | | | | | | | | | 219 |
| C26 | 30 | −5 | −15 | −33 | −3 | −8 | −21 | 0 | −1 | −7 | −3 | −9 | −25 | |
| M21 | 50 | | | | | | | | | | | | | |
| Y3 | 30 | | | | | | | | | | | | | 216 |
| C26 | 30 | −6 | −13 | −31 | −5 | −7 | −20 | −3 | −2 | −9 | −4 | −8 | −24 | |
| M22 | 50 | | | | | | | | | | | | | |
| Y3 | 30 | | | | | | | | | | | | | 200 |
| C26 | 30 | −3 | −13 | −31 | −1 | −9 | −20 | −1 | −5 | −10 | −2 | −9 | −23 | |
| M21 | 50 | | | | | | | | | | | | | |
| Y3 | 30 | | | | | | | | | | | | | 203 |
| C26 | 30 | −7 | −16 | −28 | −1 | −5 | −13 | −9 | −20 | −32 | −2 | −6 | −13 | |
| M11 | 50 | | | | | | | | | | | | | |
| Y19 | 30 | | | | | | | | | | | | | 197 |
| C26 | 30 | −6 | −17 | −33 | −2 | −9 | −17 | −1 | −9 | −23 | −2 | −10 | −18 | |
| M11 | 50 | | | | | | | | | | | | | |
| Y6 | 30 | | | | | | | | | | | | | 230 |
| C26 | 30 | −7 | −13 | −32 | −3 | −6 | −16 | −1 | −4 | −9 | −1 | −3 | −12 | |
| M11 | 50 | | | | | | | | | | | | | |
| Y21 | 30 | | | | | | | | | | | | | 202 |

TABLE 8

| Mixture of dyes no | mg | Red 4 h | Red 12 h | Red 28 h | Green 4 h | Green 12 h | Green 28 h | Blue 4 h | Blue 12 h | Blue 28 h | Visual 4 h | Visual 12 h | Visual 28 h | Density Visual |
|---|---|---|---|---|---|---|---|---|---|---|---|---|---|---|
| C26 | 30 | −3 | −4 | −12 | −1 | −1 | −5 | 0 | 0 | −3 | −1 | −2 | −6 | |
| M11 | 50 | | | | | | | | | | | | | |
| D2 | 30 | | | | | | | | | | | | | 312 |
| C26 | 30 | −2 | −9 | −20 | 0 | −5 | −12 | 1 | 3 | 7 | −1 | −6 | −15 | |
| M22 | 50 | | | | | | | | | | | | | |
| D2 | 30 | | | | | | | | | | | | | 234 |
| C26 | 30 | −3 | −10 | −23 | −1 | −6 | −14 | 0 | 0 | 3 | −2 | −7 | −17 | |
| M21 | 50 | | | | | | | | | | | | | |
| D2 | 30 | | | | | | | | | | | | | 235 |
| C18 | 30 | 0 | −5 | −14 | 0 | −4 | −12 | 0 | 2 | 2 | 0 | −2 | −11 | |
| M22 | 50 | | | | | | | | | | | | | |
| D2 | 30 | | | | | | | | | | | | | 208 |
| C18 | 30 | −1 | −6 | −18 | −1 | −5 | −14 | 0 | −2 | −1 | 0 | −4 | −13 | |

TABLE 8-continued

| Mixture of dyes no | mg | Red 4 h | Red 12 h | Red 28 h | Green 4 h | Green 12 h | Green 28 h | Blue 4 h | Blue 12 h | Blue 28 h | Visual 4 h | Visual 12 h | Visual 28 h | Density Visual |
|---|---|---|---|---|---|---|---|---|---|---|---|---|---|---|
| M21 | 50 | | | | | | | | | | | | | |
| D2 | 30 | | | | | | | | | | | | | 209 |
| C26 | 30 | −1 | −7 | −16 | 0 | −2 | −8 | 3 | 4 | 6 | 0 | −3 | −8 | |
| M11 | 50 | | | | | | | | | | | | | |
| D4 | 30 | | | | | | | | | | | | | 265 |
| C26 | 30 | −2 | −7 | −18 | 0 | −3 | −9 | 0 | −2 | −10 | 0 | −3 | −11 | |
| M11 | 50 | | | | | | | | | | | | | |
| D1 | 30 | | | | | | | | | | | | | 267 |
| C26 | 30 | −3 | −9 | −20 | −1 | −5 | −12 | 0 | 0 | 0 | −1 | −6 | −15 | |
| M22 | 50 | | | | | | | | | | | | | |
| D1 | 30 | | | | | | | | | | | | | 238 |
| C26 | 30 | −2 | −7 | −16 | −1 | −3 | −8 | 3 | 4 | 6 | 0 | −3 | −8 | |
| M11 | 50 | | | | | | | | | | | | | |
| D3 | 30 | | | | | | | | | | | | | 257 |
| C26 | 30 | −3 | −8 | −21 | −1 | −3 | −11 | 0 | 0 | −1 | −2 | −5 | −16 | |
| M21 | 50 | | | | | | | | | | | | | |
| D1 | 30 | | | | | | | | | | | | | 221 |
| C18 | 30 | −1 | −5 | −19 | −1 | −4 | −13 | 0 | −2 | −7 | −1 | −4 | −15 | |
| M22 | 50 | | | | | | | | | | | | | |
| D1 | 30 | | | | | | | | | | | | | 211 |
| C26 | 30 | −3 | −8 | −19 | −1 | −4 | −10 | −1 | −1 | −3 | −1 | −4 | −11 | |
| M11 | 50 | | | | | | | | | | | | | |
| D4 | 20 | | | | | | | | | | | | | |
| Y22 | 10 | | | | | | | | | | | | | 271 |
| C26 | 30 | −3 | −8 | −18 | −2 | −4 | −10 | 0 | 0 | −1 | −1 | −4 | −11 | |
| M11 | 50 | | | | | | | | | | | | | |
| D4 | 20 | | | | | | | | | | | | | |
| Y23 | 10 | | | | | | | | | | | | | 271 |
| C26 | 30 | −2 | −8 | −17 | −1 | −3 | −9 | 0 | −1 | −2 | — | −3 | −9 | |
| M11 | 50 | | | | | | | | | | | | | |
| D3 | 20 | | | | | | | | | | | | | |
| Y22 | 10 | | | | | | | | | | | | | 271 |
| C26 | 30 | −2 | −7 | −18 | −1 | −3 | −9 | 0 | 0 | 0 | −1 | −3 | −9 | |
| M11 | 50 | | | | | | | | | | | | | |
| D3 | 20 | | | | | | | | | | | | | |
| Y23 | 10 | | | | | | | | | | | | | 268 |

EXAMPLE 2

A yellow dye-donor element was prepared as follows.

A coating solution was prepared consisting of 10 ml 2-butanone as solvent, 50 mg co-acrylonitrile-styrene as binder together with 50 mg of dye D1. From this solution a layer having a wet thickness of 100 μm was coated on 6 μm thick polyethylene terephthalate film. The resulting layer was dried by evaporation of the solvent.

A commercially available Mitsubishi material type CK 100 TS (transparant receiver) was used as receiving element.

The dye-donor element was printed in combination with the receiving element in a Mitsubishi CP 100 E printer.

The receiver sheet was separated from the dye-donor element and the color density of the recorded yellow image was measured by means of a Macbeth TR 924 densitometer in the blue region in Status A mode.

The obtained density was 2.12.

What is claimed is:

1. Dye-donor element for use according to thermal dye transfer methods, said element comprising a support having thereon a dye layer comprising a dye layer carried by a polymeric binder resin, characterized in that said dye is an azo dye corresponding to the following general formula (I):

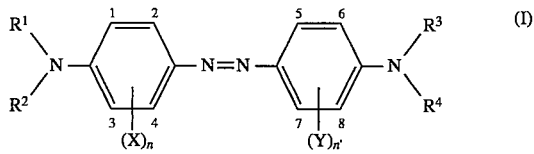

wherein
each of $R^1$ to $R^4$ independently represent hydrogen, an unsubstituted alkyl group, a cycloalkyl group or an aryl group, or $R^1$ and $R^2$ and/or $R^3$ and $R^4$ may be joined together to form a 5- or 6-membered heterocyclic ring system, or each of $R^1$ to $R^4$ independently can be joined to the carbon atom of the aromatic ring at a position ortho to the position of attachment of the anilino nitrogen to form a 5- or 6-membered ring;

X and Y independently represent a substituent; selected from the group consisting of SH, OH, halogen, $NO_2$, CN, alkyl, amino, carbonamido, sulfonamido, acylamido, sulfonylamino phosphorylamino, alkoxy, thialkoxy, alkoxycarbonyl and aryloxycarbonyl;

n represent 0, 1, 2, 3, or 4, X substituents may be the same or different when is greater than 1;

n' represents 0, 1, 2, 3 and 4, and Y substitutents may be the same or different when n' is greater than 1.

2. Dye-donor element according to claim 1, wherein $R^1$ to $R^4$ independently represent an unsubstituted alkyl group, X represents hydroxy, carbonamido or sulfonamido, n represents 0 or 1 and n' represents 0.

3. Dye-donor element according to claim 1, wherein said dye-donor element further comprises in the same dye area or in another dye area a dye corresponding to the general formula (II):

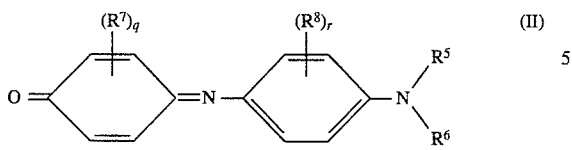

wherein:

$R^5$ and $R^6$ independently represent hydrogen, an alkyl group, a cycloalkyl group, an aryl group, an allyl group or an alkenyl group, or $R^5$ and $R^6$ together with the nitrogen to which they are attached form the necessary atoms to close a 5- or 6-membered heterocyclic ring, or $R^5$ and/or $R^6$ together with the nitrogen to which they are attached and either or both carbon atoms of the phenyl ring ortho to said nitrogen atom form a 5- or 6-membered heterocyclic ring, $R^7$ represents halogen, hydroxy, cyano, an alkyl group, a cycloalkyl group, an aryl group, an alkoxy group, an aryloxy group, an alkylthio group, an arylthio group, an amino group, an alkylcarbonylamino group, an arylcarbonylamino group, an arylsulfonylamino group, an alkoxycarbonylamino group, an aryloxycarbonylamino group, an alkylthiocarbonylamino group, an arylthiocarbonylamino group, an alkylphosphoramidate group, an arylphosphoramidate group, an alkylphosphonamidate group, an arylphosphonamidate group, an alkylaminocarbonyl group or an arylaminocarbonyl group, or $R^7$ represents the necessary atoms to close an alicyclic or aromatic or heterocyclic ring fused-on the phenylene ring;

q represents 0, 1, 2, 3 or 4, the $R^7$ substituents may be the same or different when q is greater than 1;

$R^8$ can have any of the significances given to $R^7$ or can represent the necessary atoms to close an alicyclic or aromatic or heterocyclic ring fused-on the phenyl ring;

r represents 0, 1, 2, 3 or 4, the $R^8$ substituents may be the same or different when r is greater than 1.

4. Dye-donor element according to claim 3, wherein both dyes are contained in the same dye area that is black colored.

5. Dye-donor element according to claim 4, wherein said dye layer further comprises a magenta heterocyclic azo aniline dye or a magenta arylazoaniline dye with electron withdrawing substituents on the aryl nucleus, having an absorption maximum between 520 and 600 nm.

6. Dye-donor element according to claim 5, wherein said magenta dye is a 4-chloro,5-formylthiazol-2-ylazoaniline dye.

7. Dye-donor element according to claim 4, wherein said dye layer further comprises a yellow dye with an absorption maximum below 460 nm.

8. Dye-donor element according to claim 7, wherein said yellow dye corresponds to the following general formula (III):

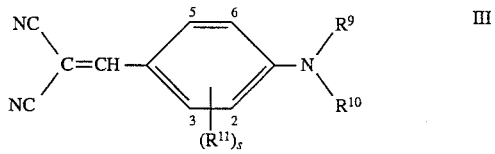

wherein:

$R^9$ and $R^{10}$ independently represent hydrogen, an alkyl group, a cycloalkyl group or an aryl group, or $R^9$ and $R^{10}$ may be joined together to form a 5- or 6-membered heterocyclic ring system, or each of $R^9$ and $R^{10}$ can be joined to the carbon atom of the aromatic ring at a position ortho to the position of attachment of the anilino nitrogen to form a 5- or 6-membered ring;

$R^{11}$ represents substitutent selected from the group consisting of alkyl, CN, alkoxy, thioalkoxy, halogen, $NO_2$ and acylamino;

s represents 0, 1, 2, 3 or 4, the $R^{11}$ substituents may be the same or different when s is greater than 1.

9. Dye-donor element according to claim 4, wherein the compounding ratio of the dyes is 10 to 50% by weight for the yellow dyes according to formula (I), 20 to 60% by weight for the cyan dyes according to formula (II), 10 to 60% by weight for the magenta dyes and 0 to 40% by weight for the yellow dyes of formula (III).

10. Dye-donor element according to claim 1, wherein the binder is cellulose acetate butyrate or co-acrylonitrile-styrene.

11. Dyed receiving element comprising a support provided with a dye-image receiving layer containing dyes in imagewise distribution, formed by thermal dye sublimation transfer using a dye-donor element comprising a support having thereon a dye layer comprising a dye carried by a polymeric binder resin, characterized in that said dye in an azo dye corresponding to the following general formula (I):

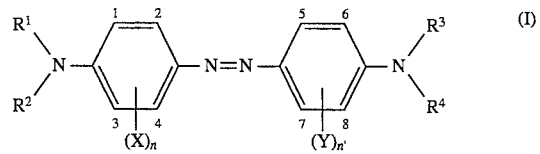

wherein each of $R^1$ to $R^4$ independently represented hydrogen, an unsubstituted alkyl group, a cycloalkyl group or an aryl group, or $R^1$ and $R^2$ and/or $R^3$ and $R^4$ may be joined together to form a 5- or 6-membered heterocyclic ring system, or each $R^1$ to $R^4$ independently can be joined to the carbon atom of the aromatic ring at a position ortho to the position of attachment of the anilino nitrogen to form a 5- or 6-membered ring;

X and Y independently represent a substituent selected from the group consisting of SH, OH, halogen, $NO_2$, CN, alkyl, amino, carbonamido, sulfonamido, acylamino, sulfonylamino, phosphorylamino, alkoxy, thioalkoxy, alkoxcarbonyl and aryloxycarbonyl;

n represents 0, 1, 2, 3 or 4, the X substituents may be the same of different when n is greater than 1;

n' represents 0, 1, 2, 3 to 4, the Y substituents may be the same different when n' is greater than 1.

12. Dyed receiving element according to claim 11 wherein said dye-donor element further comprises in the same dye area or in another dye area a dye corresponding to the general formula (II):

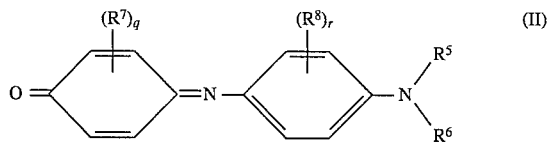

wherein $R^5$ and $R^6$ independently represent hydrogen, an alkyl group, a cycloalkyl group, an aryl group, an allyl group or an alkenyl group, or $R^5$ and $R^6$ together with the nitrogen to which they are attached form the necessary atoms to close a 5- or 6-membered heterocyclic ring, or R⁵ and/or R⁶ together with the nitrogen to which they are attached and either or both carbon atoms of the phenyl ring ortho to said nitrogen atom form a 5- or 6-membered heterocyclic ring;

R⁷ represents halogen, hydroxy, cyano, an alkyl group, a cycloalkyl group, an aryl group, an alkoxy group, an aryloxy group, an alkylthio group, an arylthio group, an amino group, an alkylcarbonylamino group, an arylcarbonylamino group, an arylsulfonylamino group, an alkoxycarbonylamino group, an aryloxycarbonylamino group, an alkylthiocarbonylamino group, an arylthiocarbonylamino group, an alkylphosphoramidate group, an arylphosphoramidate group, an alkylphosphonamidate group, an arylphosphonamidate group, an alkylaminocarbonyl group or an arylaminocarbonyl group, or R⁷ represents the necessary atoms to close an alicyclic or aromatic or heterocyclic ring fused-on the phenylene ring;

q represents 0, 1, 2, 3 or 4, the R⁷ substituents may be the same or different when q is greater than 1;

R⁸ can have any of the significances given to R⁷ or can represent the necessary atoms to close an alicyclic or aromatic or heterocyclic ring fused-on the phenyl ring;

r represents 0, 1, 2, 3 or 4, the R⁸ substitutents may be the same or different when r is greater than 1.

13. Dyed receiving element according to claim 12 wherein both dyes are contained in the same dye area that is black colored.

14. Dyed receiving element according to claim 13 wherein said dye layer further comprises a magenta heterocyclic azo aniline dye or a magenta arylazoaniline dye with electron withdrawing substituents on the aryl nucleus, having an absorption maximum between 520 and 600 nm.

15. Dyed receiving element according to claim 13, said dye layer further comprises a yellow dye with an absorption maximum below 460 nm.

16. Dyed receiving element according to claim 15 wherein said yellow dye corresponds to the following general formula (III):

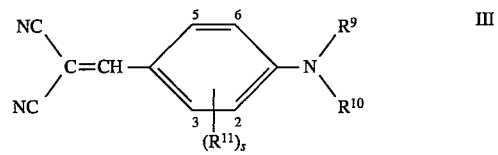

wherein:

R⁹ and R¹⁰ independently represent hydrogen, an alkyl group, a cycloalkyl group or an aryl group, or R⁹ and R¹⁰ may be joined together to form a 5- or 6-membered heterocyclic ring system, or each of R⁹ and R¹⁰ can be joined to the carbon atom of the aromatic ring at a position ortho to the position of attachment of the anilino nitrogen to form a 5- or 6-membered ring R¹¹ represents a substituent selected from the group consisting of alkyl, CN, alkoxy, thioalkoxy, halogen, NO₂ and acylamino;

s represents 0, 1, 2, 3 or 4, the R¹¹ substituents may be the same or different when s is greater than 1.

* * * * *

UNITED STATES PATENT AND TRADEMARK OFFICE
CERTIFICATE OF CORRECTION

PATENT NO. : 5,510,225  
DATED : April 23, 1996  
INVENTOR(S) : Wilhelmus Janssens et al It is certified that error appears in the above-indentified patent and that said Letters Patent is hereby corrected as shown below:

Column 3, TABLE 1, under column X, Dye listing D6 "4-NHCOCH" should read -- 4-NHCOCH$_3$ --;

Column 4, line 67, "phenyl ene" should read-- phenylene --;

Column 14, line 6, "celluloseacetate," should read -- cellulose acetate, --;

Claim 1, column 19, line 64, "a dye layer carried" should read -- a dye carried --;

Claim 1, column 20, line 53, "a substituent; selected" should read -- a substituent selected --;

Claim 1, column 20, lines 56/57, "thi-alkoxy" should read -- thio-alkoxy --;

Claim 1, column 20, line 59, "when is greater than 1;" should read -- when n is greater than 1; --;

Claim 3, column 21, line 18, "ring," should read -- ring; --;

Claim 3, column 21, line 33, "phenyl ene ring;" should read -- phenylene ring; --;

Claim 8, column 22, line 5, "$R^{11}$ represents substitutent" should read -- $R^{11}$ represents a substituent --;

UNITED STATES PATENT AND TRADEMARK OFFICE
CERTIFICATE OF CORRECTION

PATENT NO. : 5,510,225

DATED : April 23, 1996

INVENTOR(S) : Wilhelmus Janssens et al

It is certified that error appears in the above-indentified patent and that said Letters Patent is hereby corrected as shown below:

Claim 11, column 22, line 34, "independently represented" should read -- independently represent --;

Claim 16, column 24, line 24, "6-membered ring" should read -- 6-membered ring; --.

Signed and Sealed this

Twenty-fourth Day of September, 1996

Attest:

BRUCE LEHMAN

Attesting Officer

Commissioner of Patents and Trademarks